May 9, 1933.　　C. M. ELLENBERGER　　1,907,524
FENDERWELL LOCK
Filed June 20, 1931
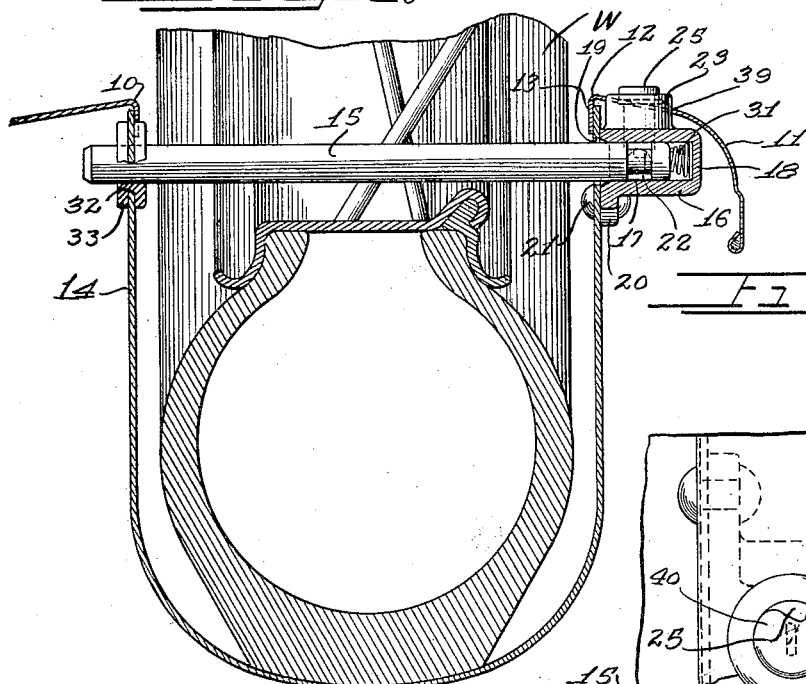
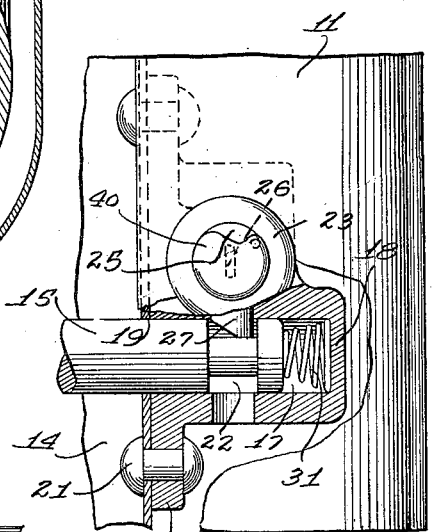
Inventor
Clarence M. Ellenberger.

Patented May 9, 1933

1,907,524

UNITED STATES PATENT OFFICE

CLARENCE M. ELLENBERGER, OF DETROIT, MICHIGAN, ASSIGNOR TO OAKES PRODUCTS CORPORATION, OF NORTH CHICAGO, ILLINOIS, A CORPORATION OF MICHIGAN

FENDERWELL LOCK

Application filed June 20, 1931. Serial No. 545,672.

This invention relates to improved locking means and arrangement for locking spare wheels or tires against theft from supporting wells provided in the front fender of automotive vehicles.

The invention relates particularly to the type of locking means comprising a bar for extending transversely of the well in position over the lower part of the spare wheel or tire to be locked in the well. At the present time, the trend is towards deeper wells in order to keep the wheel or tire lower on the vehicle, and the general object of the invention is to provide improved locking means so arranged that the locking bar may be supported low enough to be in position just above the lower part of the spare wheel or tire to prevent vertical displacement or removal thereof.

An important feature of the invention is the provision of a fitting at one side of the well forming a socket or bore closed at its outer end and open to the well for the insertion therein of the end of a bolt to support the bolt transversely of the well, together with lock means for locking the bolt to the fitting.

A further feature of the invention is the location of the fitting below the outer roll or skirt of the fender where it will bring the bolt down sufficiently low in a deep well and where it will be more protected against tampering.

The above and other features of the invention are incorporated in the structure disclosed on the drawing, in which drawing Figure 1 is a vertical section through a fender well and a spare wheel supported thereon with the locking means applied;

Figure 2 is a plan view of the bolt with the locking fitting partly in section;

Figure 3 is an enlarged view of part of the fender with the locking means in end elevation;

Figure 4 is an end elevation partly in vertical section of the locking fitting showing a modified form of lock which might be used.

The fender 10 shown is of the usual construction having the depending roll or skirt 11 along its outer side. The fender is cut out to leave an opening 12 and the metal adjacent the opening is deflected downwardly to form the supporting flange 13 to which the fender well body 14 is secured to be suspended below the opening 12 for the reception of a spare wheel or tire in the usual manner. I have shown a spare wheel W supported in the well.

The locking means shown comprises a locking bar or bolt 15 and a fitting 16. This fitting has the cylindrical bore or pocket 17 open at its inner end but closed at its outer end by the wall 18 which preferably forms an integral part of the fitting. The bore or pocket serves to receive the outer end of the bar 15 which is shown as being cylindrical and the fitting may be placed in any convenient location adjacent to the side of the well for projection of the bar therefrom transversely of the well above the lower part of the rim of the spare wheel or tire supported in the well. Where the well is deep and the bar must be lower in order to be close to the wheel or tire rim, the fitting is preferably located below the skirt 11 of the fender and the outer wall of the fender is provided with the opening 19 in register with the fitting bore. The fitting has a flange 20 by which is may be rigidly secured to the outer wall of the well by welding, or as shown by rivets 21.

Near its outer end the bolt has the notch or circumferential groove 22 and at one side of ith bore 17 the fitting 16 has the vertical extension 23 forming a cylindrical pocket 24 for a lock barrel 25 which may be turned by means of a suitable key inserted in the key-hole 26. At the bottom of the lock pocket the fitting has the transverse guideway 25' for a locking detent 27, the guideway communicating with the bore 17 so that the detent may be shifted into the locking groove 22 of the bolt when the bolt is inserted into the bore 17. The lock barrel or cylinder has the cam extension 28 at its lower end for engaging in the cross slot 29 of the detent, so that when the lock barrel is turned the detent will be shifted axially into or out of the locking groove 22 of the bolt. In the arrangement of Figures 1 to 3, a spring 30 is interposed between the outer end of the guideway 26 and the detent and this spring tends to shift the detent outwardly into locking engagement with the bolt. As shown in Figure 2, the end of the detent is beveled so that when the bolt is inserted in the fitting bore 17 the detent will be shifted outwardly until the locking groove 22 comes into registration with the guideway 26 and then the spring 30 will shift the detent outwardly into the locking groove of the bolt to thus lock the bolt to the fitting.

I have shown a spring 31 located in the outer end of the fitting bore 17, this spring being compressed when the bar is inserted into the fitting and tends to hold the bolt against the detent to prevent rattling of the bolt during travel of the vehicle. The spring serves also to shift the bolt outwardly when the lock barrel is turned by the key to withdraw the detent.

Means may be provided for supporting the outer end of the bolt 15. As shown, the inner wall of the fender well 14 has the opening 32 opposite the opening 19 in the outer wall of the well and when the locking bolt is to be applied after insertion of a spare wheel or tire in the well, its outer end is first inserted through the opening 32 in the inner wall of the well and then the outer end of the bolt is inserted through the opening 19 in the outer wall of the well and into the fitting 16 for locking engagement with the detent 27. I preferably provide a bushing 33 in the opening 32 and this bushing may be of more or less resilient material such as rubber and the inner diameter of the bushing is preferably somewhat less than the diameter of the bolt so that when the bolt is inserted it will be frictionally held and prevented from rattling. To facilitate insertion of the bolt into the bushing, the bolt end is beveled as indicated. The flexibility of the bushing 33 will also facilitate the insertion of the bolt 15 from an angular position relative to the fenderwell inner wall.

Figure 1 shows the locking bolt in locking position. If it is desired to withdraw the bolt for removal of the spare wheel or tire, the key is inserted in the lock barrel and the barrel turned to withdraw the detent 27 against the force of the spring 30. The spring 31 will then tend to shift the bolt outwardly of the fitting 16 and the bolt can be positively removed by shifting it rearwardly until its outer end clears the fitting 16 whereupon it is swung upwardly and then withdrawn from the bushing 33. To reapply the bolt to lock a spare wheel or tire in the well, it is first inserted with its inner end into the bushing 33 and then it is deflected downwardly into registration with the fitting 16 and shifted therein against the depression of the spring 31 until the locking detent snaps into the locking groove 22, whereafter the bolt will be rigidly held and the spare wheel or tire secured against theft.

Figure 4 shows a modified form of lock which might be used for locking the bolt. The locking detent 34 is rotatably mounted in the lower part of the lock pocket 35 and it has tongue and groove connections 36 with the lock barrel 37 which is rotatable by a key. The detent cylinder has a cross notch 38 at one side which is concave and of a radius substantially equal to the radius of the body of the bolt 15. When the cylindrical side of the detent 34 engages in the locking channel 22 of the bolt, the bolt will be locked against axial movement. When the detent is turned with the lock cylinder to 180 degrees to bring its notch 37 in register with the bolt the bolt will be free to move past the notch. With the arrangement shown, the key must be used for turning the lock to bring the detent either into locking or unlocking position relative to the bolt.

To permit access to the locking cylinder, the fender skirt 11 has the opening 39 through which the lock barrel supporting extension 23 on the fitting 16 may extend, and to protect the key-hole against dirt or the weather, a lid 40 may be pivoted on the lock barrel 25 as indicated in Figure 2.

I have shown a practical and efficient embodiment of the features of my invention, but do not desire to be limited to the exact structure and arrangement shown as changes or modifications may be made without departing from the scope and principles of the invention, as defined by the appended claims.

I claim as follows:

1. The combination with a well for supporting a spare wheel or tire, of a fitting at one side of said well having a bore closed at its outer end and open to the well at its inner end, a locking bolt extensible into said bore for projection transversely of the well above the lower part of a spare tire or wheel supported in the well, said fitting and bolt being provided with a coacting detent and notch adapted to secure the bolt against axial movement, and locking mechanism for operating said detent.

2. The combination with a well for receiving a spare wheel or spare tire, of a locking bolt, a fitting secured at one side of the well and having a bore open to the well but closed at its outer end, said bore serving to receive one end of the locking bolt, a support at the other side of the well for the other end of the bolt, and locking means on said fitting for locking said bolt thereto against axial movement.

3. The combination with a fender having a depression or well for receiving a spare wheel or tire, of supporting means comprising outer and inner members secured respectively at the outer and inner walls of said well, said outer supporting member providing a socket open to the well but closed at its outer end, a locking bolt applicable to the inner supporting member by axial shift of the bolt in one direction and into the socket of the outer member by shifting in the opposite direction, and locking means for locking said bolt against removal from said socket.

4. The combination with a fender having a depression or well for receiving a spare wheel or tire, of supporting means comprising a pair of supporting elements secured one at each side of the well, one of said elements providing a socket open to the well but closed at its other end, said other element comprising an elastic resilient bushing, a locking bolt received at one end by said bushing and extending at its other end into said socket, and locking means for locking the bolt against removal from said socket.

5. The combination with a U-shaped support for a spare wheel or tire, of a locking bolt for extending cross-wise of said support, a fitting secured at one side of said support forming a socket closed at its outer end but open at its inner end for the insertion of the head end of said bolt by axial movement of the bolt in one direction, supporting means at the other side of said support to which the other end of said bolt must be applied by axial movement of the bolt in the opposite direction before insertion of the bolt head end into said socket, a coacting detent and notch adapted to secure the bolt to said fitting against sliding movement, and lock mechanism for operating the detent.

In testimony whereof I have hereunto subscribed my name at North Chicago, Lake County, Illinois.

CLARENCE M. ELLENBERGER.